United States Patent
Zhao et al.

(10) Patent No.: US 11,097,721 B1
(45) Date of Patent: Aug. 24, 2021

(54) METHODS AND SYSTEM FOR MODULATING TORQUE DURING A TRANSMISSION GEAR SHIFT

(71) Applicant: Ford Global Technologies, LLC, Dearborn, MI (US)

(72) Inventors: Yanan Zhao, Ann Arbor, MI (US); Rajit Johri, Canton, MI (US); Judhajit Roy, Royal Oak, MI (US); Christopher John Teslak, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/836,398

(22) Filed: Mar. 31, 2020

(51) Int. Cl.
| | |
|---|---|
| *B60W 20/13* | (2016.01) |
| *F16H 63/50* | (2006.01) |
| *B60W 10/06* | (2006.01) |
| *B60W 10/08* | (2006.01) |

(52) U.S. Cl.
CPC ............ *B60W 20/13* (2016.01); *B60W 10/06* (2013.01); *B60W 10/08* (2013.01); *F16H 63/50* (2013.01); *B60W 2510/1005* (2013.01); *B60W 2510/244* (2013.01); *B60W 2710/0666* (2013.01); *B60W 2710/083* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 6,616,569 | B2* | 9/2003 | Hoang | F02D 41/065 477/3 |
| 7,370,715 | B2* | 5/2008 | Colvin | B60W 10/08 180/65.28 |
| 7,600,595 | B2* | 10/2009 | Harris | B60K 17/28 180/65.31 |
| 7,766,107 | B2* | 8/2010 | Joe | B60W 20/00 180/65.21 |
| 8,606,482 | B2* | 12/2013 | Carlhammar | B60W 10/11 701/101 |
| 8,612,078 | B2* | 12/2013 | Schulte | B60K 6/48 701/22 |
| 8,721,498 | B2 | 5/2014 | Schang et al. | |
| 8,798,838 | B2* | 8/2014 | Yamanaka | B60W 20/00 701/22 |
| 9,365,205 | B2 | 6/2016 | Inagawa et al. | |
| 9,457,798 | B2* | 10/2016 | Futatsudera | B60W 10/06 |
| 10,030,600 | B2* | 7/2018 | Emig | F01N 13/10 |
| 10,059,326 | B2* | 8/2018 | Kim | B60W 20/20 |
| 10,543,739 | B1* | 1/2020 | Zhou | B60K 6/448 |
| 10,894,538 | B2* | 1/2021 | Kitahata | B60W 20/13 |
| 2015/0307086 | A1* | 10/2015 | Ketfi-Cherif | B60W 10/08 701/22 |
| 2020/0062236 | A1* | 2/2020 | Takahashi | B60W 10/08 |

\* cited by examiner

*Primary Examiner* — Dirk Wright
(74) *Attorney, Agent, or Firm* — David Kelley; McCoy Russell LLP

(57) ABSTRACT

A method and system for operating a vehicle that includes an electric machine and an internal combustion engine is described. In one example, the method includes arbitrating between providing torque compensation to a driveline via an internal combustion engine or via an electric machine to improve transmission gear shifting. The method may consider a plurality of vehicle operating conditions to aid the arbitration.

20 Claims, 9 Drawing Sheets

METHODS AND SYSTEM FOR MODULATING TORQUE DURING A TRANSMISSION GEAR SHIFT

FIELD

The present description relates to methods and a system for selecting a vehicle propulsion source to provide torque to smooth a transmission gear shift. The methods and systems may be suitable for hybrid vehicles.

BACKGROUND AND SUMMARY

A transmission of a hybrid vehicle may be shifted from time to time to improve driveline or powertrain efficiency or to generate a desired wheel torque. The transmission gear shift may include releasing an applied gear clutch and closing an on-coming gear clutch. Opening and closing of the gear clutches may cause noticeable driveline torque disturbances. Therefore, it may be desirable to provide a way of reducing the possibility of driveline torque disturbances that may be related to transmission gear shifts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
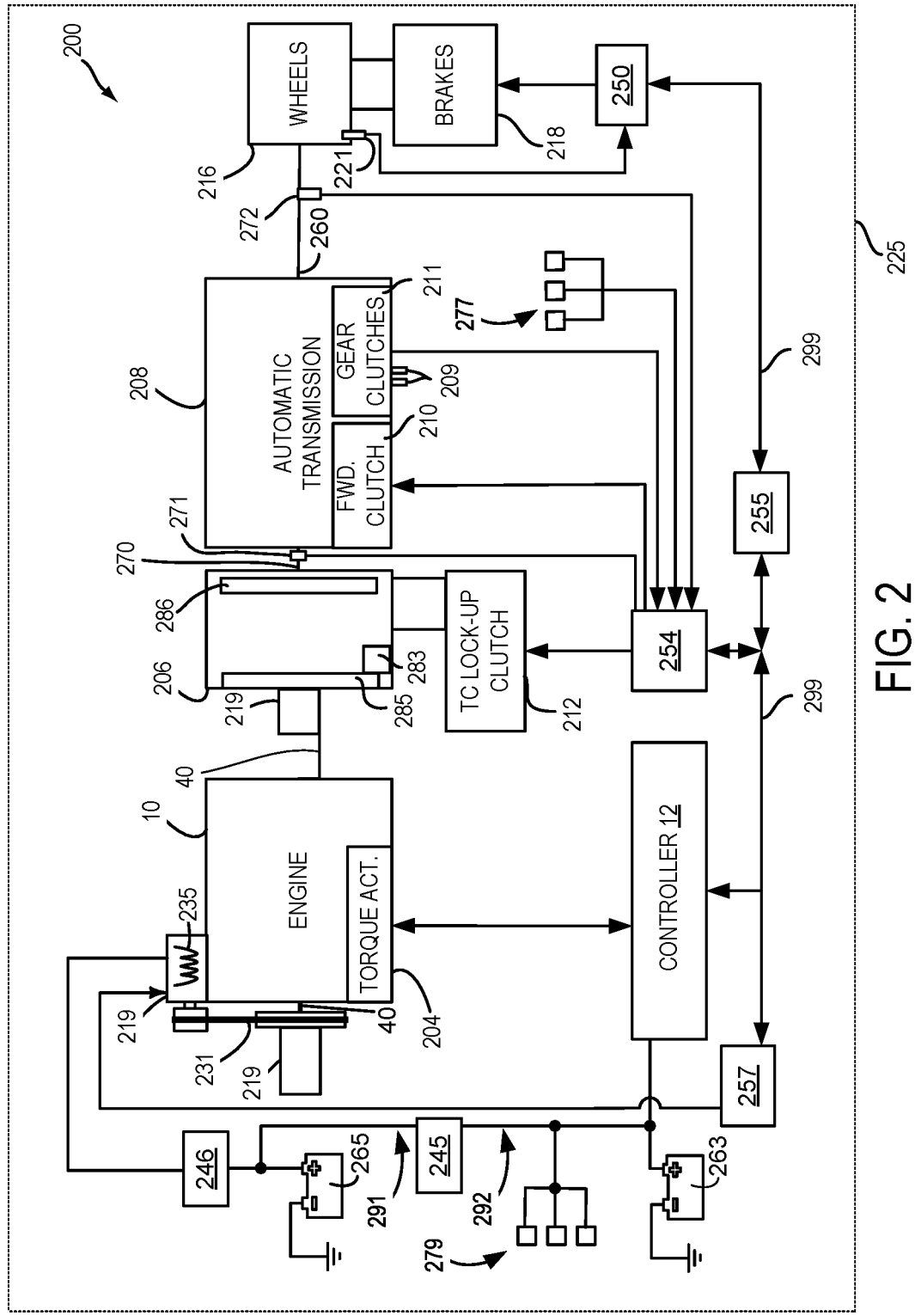
FIG. 2 shows a schematic diagram of an example vehicle driveline or powertrain including the internal combustion engine shown in FIG. 1.
Figure 3:
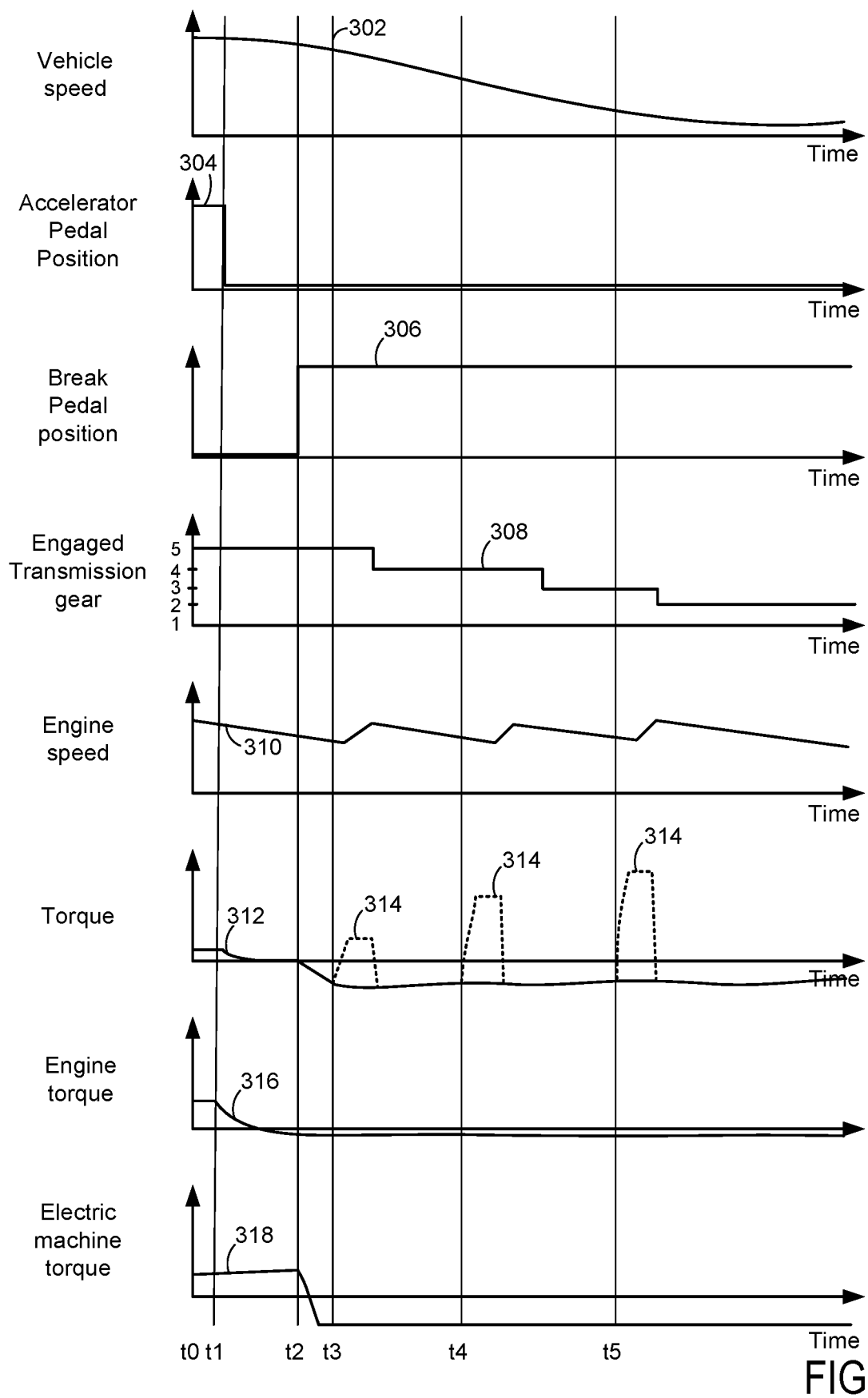
FIG. 3 shows an example vehicle operating sequence according to the method of FIGS. 4-9.

The present description is related to arbitrating and selecting a propulsion torque source to provide torque compensation during a transmission gear shift of a hybrid vehicle. The arbitration may include evaluating vehicle parameters to determine which of a plurality of propulsion torque sources is most suited to compensate for gear shifting. One of the plurality of torque sources may be an internal combustion engine as shown in FIG. 2. Other propulsion torque sources may include a belt integrated starter/generator and an integrated starter/generator as shown in FIG. 2. The propulsion torque sources may adjust torque that is supplied to a torque converter impeller or a transmission input shaft during a transmission gear shift as shown in FIG. 3. A method for selecting which of a plurality of driveline or powertrain torque sources supplies compensation torque during a transmission gear shift is shown in FIGS. 4-9.

An automatic transmission may be downshifted in response to an increase in driver demand torque. In addition, the transmission may be shifted as vehicle speed increases and as vehicle speed decreases. Hybrid vehicles that include a belt integrated starter/generator and/or an integrated starter/generator may provide positive torque (e.g., to propel the vehicle) or negative torque (e.g., to slow the vehicle) and to smooth driveline torque delivery to the vehicle's wheels. However, the vehicle's engine may also provide positive and negative torque to the driveline. While it may be convenient to implement one propulsion source as a default torque actuator to smooth driveline torque delivery to the vehicle's wheels during a gear shift, it may be inefficient or impracticable to do so. Therefore, it may be desirable to provide a way of arbitrating and/or selecting which propulsion torque source provides torque compensation during a transmission gear shift.

The inventors herein have recognized the above-mentioned issues and have developed a method for operating a vehicle, comprising: entering an engine into a fuel cut-off mode and continuing to rotate the engine via a controller in response to releasing an accelerator pedal and applying a brake pedal; and arbitrating between increasing torque of the engine or increasing torque of an electric machine via the controller in response to a transmission gear shift while the engine is in the fuel cut-off mode.

By arbitrating between increasing torque of an engine or increasing torque of an electric machine during a transmission gear shift, it may be possible to provide the technical result of improving driveline efficiency while reducing the possibility of generating driveline torque disturbances during the transmission gear shift. In addition, arbitrating between two propulsion torque sources may reduce a possibility of battery degradation and ISG belt degradation.

The present description may provide several advantages. Specifically, the approach may deliver gear shifting torque compensation via a propulsion torque source that may be most suited for the task. Further, the approach may improve driveline efficiency during transmission gear shifting. In addition, the approach may reduce the possibility of belt degradation for belt integrated starter/generators.

The above advantages and other advantages, and features of the present description will be readily apparent from the following Detailed Description when taken alone or in connection with the accompanying drawings.

Figure 1:
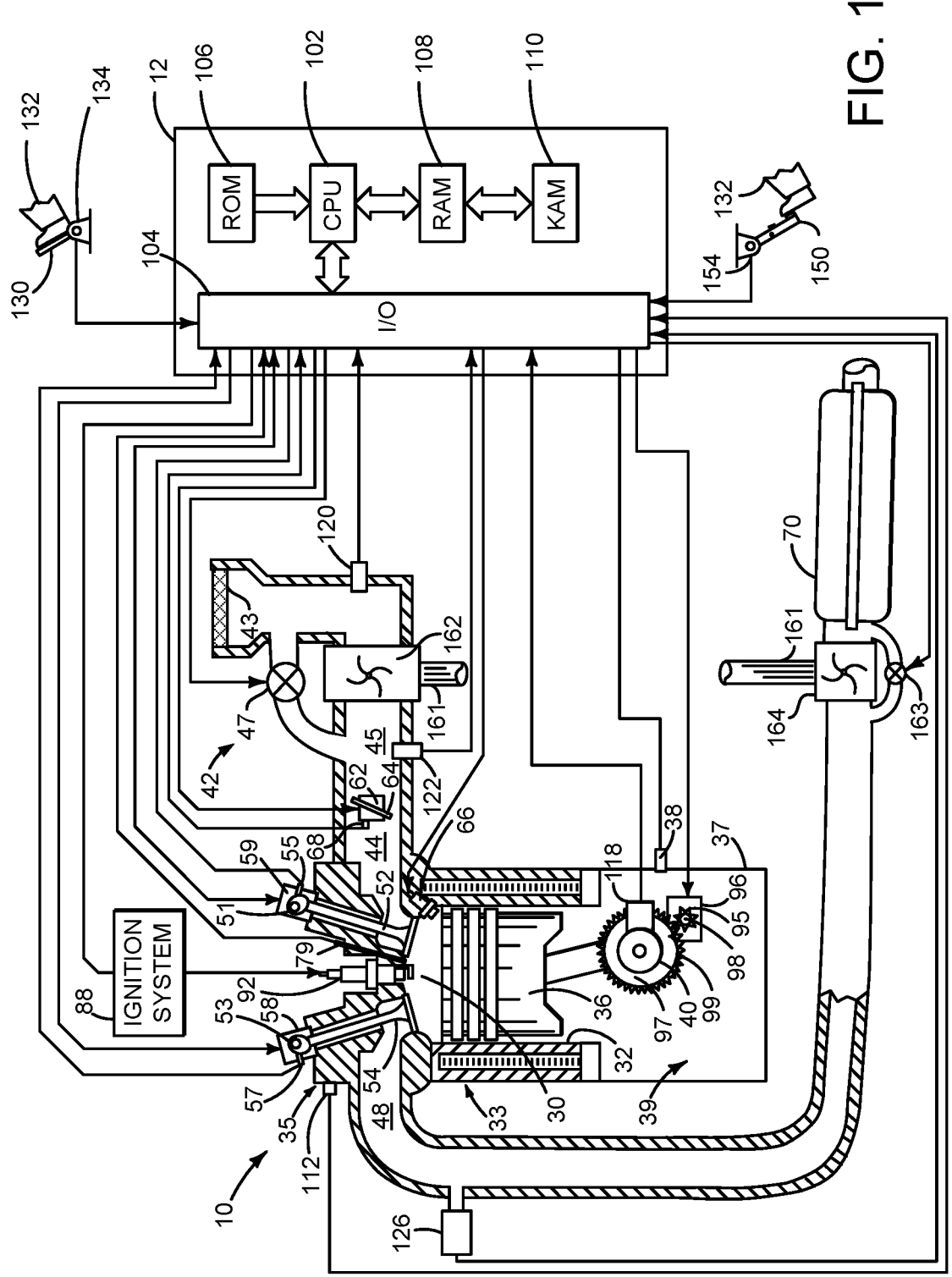
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices. Controller 12 may reduce compression in cylinder 30 via opening compression relief valve 79 during engine starting to reduce engine cranking torque.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, integrated starter/generator (ISG) controller 257, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, and information regarding degraded brakes). Further, the vehicle system controller 255 may provide commands to engine controller 12, ISG controller 257, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250, engine controller 12, and electric machine controller 257, thereby providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, ISG controller 257, transmission controller 254, and brake controller 250. Alternatively, the vehicle system controller 255 and the engine controller 12 may be a single unit while the ISG controller 257, transmission controller 254, and the brake controller 250 are standalone controllers.

Driveline 200 is shown to include an ISG 219. ISG 219 may be located or positioned as shown in one of three locations. ISG 219 may be coupled to crankshaft 40 of engine 10 via a belt 231. Alternatively, ISG 219 may be directly coupled to crankshaft 40. In another example, ISG 219 may be coupled to input shaft 270 of transmission 208. ISG 219 may provide a negative torque to driveline 200 when charging electric energy storage device 263. ISG 219 may also provide a positive torque to rotate driveline 200 via energy supplied by electric energy storage device (e.g., a battery or capacitor) 265. In one example, electric energy storage device may output a higher voltage than electric energy storage device 263. DC/DC converter 245 may allow exchange of electrical energy between high voltage bus 291 and low voltage bus 292. High voltage bus 291 is electrically coupled to inverter 246 and electric energy storage device 265. Low voltage bus 292 is electrically coupled to electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 265. Vehicle system controller 255 may request increased engine torque to overcome the charging torque and to meet the driver demand torque.

Engine 10 may be started with an engine starting system shown in FIG. 1 or alternatively via ISG 219. Further, torque of engine 10 may be adjusted via torque actuator 204, such as a fuel injector, throttle, etc. An engine output torque may be transmitted to torque converter 206 via crankshaft 40. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly transferred to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate forward clutch 210 and gear clutches 211. Pump 283 is driven via impeller 285, which rotates at a same speed as crankshaft 40.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates the requested driver demand torque to the engine 10 and ISG 219. Vehicle system controller 255 requests the engine torque from engine controller 12. If the engine and ISG torque are less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

In response to a request to slow vehicle 225, vehicle system controller 255 requests a friction braking torque by applying friction brakes 218. Further, a portion of the braking torque may be generated via ISG 219. ISG 219 may charge electric energy storage device 263 during such conditions. Accordingly, torque control of the various powertrain components may be supervised by vehicle system controller 255 with local torque control for the engine 10, ISG 219, transmission 208, and brakes 218 provided via engine controller 12, transmission controller 254, ISG controller 257, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that wheels do not lock for an extended period of time.

The system of FIGS. 1 and 2 provides for a vehicle system, comprising: an internal combustion engine; a transmission coupled to the engine; an electric machine coupled to the engine or the transmission; and a controller including executable instructions stored in non-transitory memory that cause the controller to increase torque output of the internal combustion engine during a first transmission gear shift in response to one of an actual total number of belt lash crossing events exceeding a threshold, availability of an active torque tensioner, and a torque increase associated with engaging a particular gear of the transmission. The vehicle system further comprises additional instructions to increase torque output of the electric machine during a second transmission gear shift in response to the actual total number of belt lash crossing events being less than the threshold.

In some examples, the vehicle system further comprises additional instructions to assign a higher priority to increasing torque output of the internal combustion engine than a priority assigned to increasing torque output of the electric machine in response to a battery discharging power limit being less than a motor power request, where the battery discharging power limit has a positive sign. The vehicle system further comprising additional instructions to assign a higher priority to increasing torque output of the electric machine than a priority assigned to increasing torque output of the internal combustion engine in response to a battery charging power limit being greater than a motor power request, where the battery charging power limit has a negative sign. The vehicle system further comprises additional instructions to assign a priority to increasing torque output of the internal combustion engine in response to a battery state of charge. The vehicle system further comprises additional instructions to assign a priority to increasing torque output of the electric machine in response to a battery state of charge. The vehicle system further comprises additional instructions to assign a priority to increasing torque output of the internal combustion engine in response to engine emissions.

Referring now to FIG. 3, plots of an example vehicle operating sequence is shown. The vehicle operating sequence that is shown in FIG. 3 may be provided via the system of FIGS. 1 and 2 in cooperation with the method of FIGS. 4-9. The vertical lines at times t0-t5 represent times of interest during the engine operating sequence. The plots shown in FIG. 3 are aligned in time.

The first plot from the top of FIG. 3 is a plot of vehicle speed versus time. The vertical axis represents vehicle speed and vehicle increases in the direction of the vertical axis arrow. The horizontal axis represents time and time increases from the left side of the plot to the right side of the plot. Trace 302 represents vehicle speed.

The second plot from the top of FIG. 3 is a plot of accelerator pedal position state versus time. The vertical axis represents accelerator pedal position state and the accelerator pedal is applied when trace 304 is at a higher level near the vertical axis arrow. The accelerator pedal is not applied when trace 304 is near the level of the horizontal axis. Trace 304 represents accelerator pedal position state. The horizontal axis represents time and time increases from the left side of the plot to the right side of the plot.

The third plot from the top of FIG. 3 is a plot of brake pedal position state versus time. The vertical axis represents brake pedal position state and the brake pedal is applied when trace 306 is at a higher level near the vertical axis arrow. The brake pedal is not applied when trace 306 is near the level of the horizontal axis. Trace 306 represents brake pedal position state. The horizontal axis represents time and time increases from the left side of the plot to the right side of the plot.

The fourth plot from the top of FIG. 3 is a plot of an engaged transmission gear versus time. The vertical axis represents the engaged transmission gear and the engaged transmission gear numbers are indicated along the vertical axis. The horizontal axis represents time and time increases from the left side of the plot to the right side of the plot. Trace 308 represents the engaged transmission gear.

The fifth plot from the top of FIG. 3 is a plot of engine speed versus time. The vertical axis represents the engine speed and the engine speed increases in the direction of the vertical axis arrow. The horizontal axis represents time and time increases from the left side of the plot to the right side of the plot. Trace 310 represents engine speed.

The sixth plot from the top of FIG. 3 is a plot of driver demand torque and modulation torque versus time. The vertical axis represents a torque level for the driver demand torque the modulation torque and the torque amount increases in the direction of the vertical axis arrow. Driver demand and modulation torque values above the horizontal axis are positive and driver demand torque and modulation torque values below the horizontal axis are negative. The horizontal axis represents time and time increases from the left side of the plot to the right side of the plot. Trace 312 represents the driver demand torque. Trace 314 represents the modulation torque and the modulation torque is equal to the driver demand torque when trace 314 is not visible.

The seventh plot from the top of FIG. 3 is a plot of engine torque versus time. The vertical axis represents the engine torque and the engine torque increases in the direction of the vertical axis arrow. The horizontal axis represents time and time increases from the left side of the plot to the right side of the plot. Trace 316 represents engine torque.

The eighth plot from the top of FIG. 3 is a plot of electric machine torque versus time. The vertical axis represents the electric machine torque and the electric machine torque increases in the direction of the vertical axis arrow. Electric machine torque values above the horizontal axis are positive and electric machine torque values below the horizontal axis are negative. The horizontal axis represents time and time increases from the left side of the plot to the right side of the plot. Trace 318 represents electric machine torque.

At time t0, the vehicle is cruising at a higher speed and the accelerator pedal is applied. The brake pedal is not applied and the transmission is engaged in fifth gear. The driver demand torque and the modulation torque are at a higher levels and the engine speed is at a higher level. The engine torque and the electric machine torque are at higher levels.

At time t1, the driver (not shown) fully releases the accelerator pedal, which causes the driver demand torque to be reduced. The vehicle speed begins to decline and the transmission remains engaged in fifth gear. The brake pedal is not applied and the engine speed is decreasing. The driver demand torque and modulation torque begin to be reduced and engine torque begins to decline. The electric machine torque remains at its previous level.

At time t2, the driver (not shown) applies the brake pedal while the accelerator pedal remains fully released. The driver demand torque and modulation torque are reduced further in response to the brake pedal being applied and the vehicle speed continues to decline. The engine speed continues to decrease and engine torque is negative (e.g., at a level of engine friction torque).

At time t3, the vehicle speed has been reduced to a level where a first transmission gear downshift is initiated. The transmission begins to downshift from fifth gear to fourth gear and modulation torque 314 is increased so that the engine and electric machine speed may be increased to match the speed that the transmission input shaft will be rotating when fourth gear is engaged. The transmission input shaft speed increases during the downshift to match the vehicle speed that is transmitted from the vehicle's wheels and through the transmission to the transmission input shaft. The accelerator pedal is not applied and the brake pedal continues to be applied. The driver demand torque is low and the engine torque is low. The electric machine torque is negative such that the electric machine helps to reduce vehicle speed.

Between time t3 and time t4, the transmission gear shift downshift is completed and fourth gear is engaged. The engine speed is increased to match transmission input shaft speed and then the engine speed decreases as vehicle speed decreases. The accelerator pedal is not applied and the brake pedal is applied. The vehicle speed continues to decrease and the driver demand torque remains low. The modulation torque is reduced to the level of the driver demand torque after the shift completes. The modulation torque may be provided either by the engine or by the electric machine according to the method of FIGS. 4-9.

At time t4, the vehicle speed has been reduced to a level where a second transmission gear downshift is initiated. The transmission begins to downshift from fourth gear to third gear and modulation torque 314 is increased again so that the engine and electric machine speed may be increased to match the speed that the transmission input shaft will be rotating when third gear is engaged. The transmission input shaft speed increases during the downshift to match the vehicle speed that is transmitted from the vehicle's wheels and through the transmission to the transmission input shaft. The accelerator pedal is not applied and the brake pedal continues to be applied. The driver demand torque is low and the engine torque is low. The electric machine torque is negative such that the electric machine helps to reduce vehicle speed.

Between time t4 and time t5, the transmission gear shift downshift is completed and third gear is engaged. The engine speed is increased to match transmission input shaft speed and then the engine speed decreases as vehicle speed decreases. The accelerator pedal is not applied and the brake pedal is applied. The vehicle speed continues to decrease and the driver demand torque remains low. The modulation torque is reduced to the level of the driver demand torque after the shift. The modulation torque may be provided either by the engine or by the electric machine according to the method of FIGS. 4-9.

At time t5, the vehicle speed has been reduced to a level where a third transmission gear downshift is initiated. The transmission begins to downshift from third gear to second gear and modulation torque 314 is increased so that the engine and electric machine speed may be increased to match the speed that the transmission input shaft will be rotating when second gear is engaged. The transmission input shaft speed increases during the downshift to match the vehicle speed that is transmitted from the vehicle's wheels and through the transmission to the transmission input shaft. The accelerator pedal is not applied and the brake pedal continues to be applied. The driver demand torque is low and the engine torque is low. The electric machine torque is negative such that the electric machine helps to reduce vehicle speed.

After time t5, the transmission gear shift downshift is completed and second gear is engaged. The engine speed is increased to match transmission input shaft speed and then the engine speed decreases as vehicle speed decreases. The accelerator pedal is not applied and the brake pedal is applied. The vehicle speed continues to decrease and the driver demand torque remains low. The modulation torque is reduced to the level of the driver demand torque after the shift. The modulation torque may be provided either by the engine or by the electric machine according to the method of FIGS. 4-9.

In this way, modulation torque may be provided to smooth a transmission gear downshift. The modulation torque may be provided by the engine or the electric machine. During some vehicle operating conditions, the engine may be assigned a higher priority so that it generates the modulation torque. However, during other vehicle operating conditions, the electric machine may be assigned a higher priority so that it generates the modulation torque.

Figure 4:
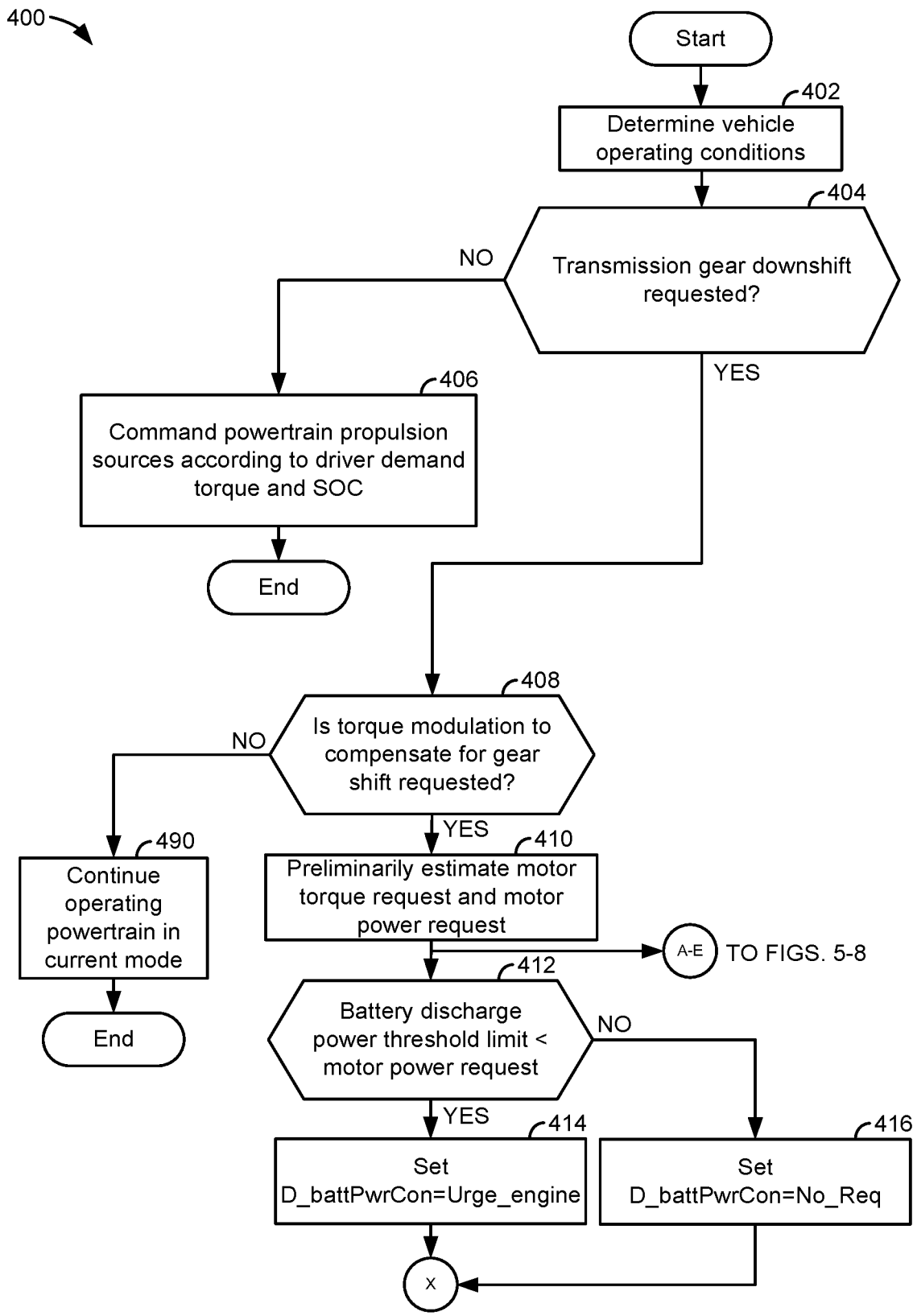
FIGS. 4-9 show a flowchart of an example method for determining which of a plurality of propulsive torque sources provides torque to compensate for a transmission gear shift.
Figure 5:
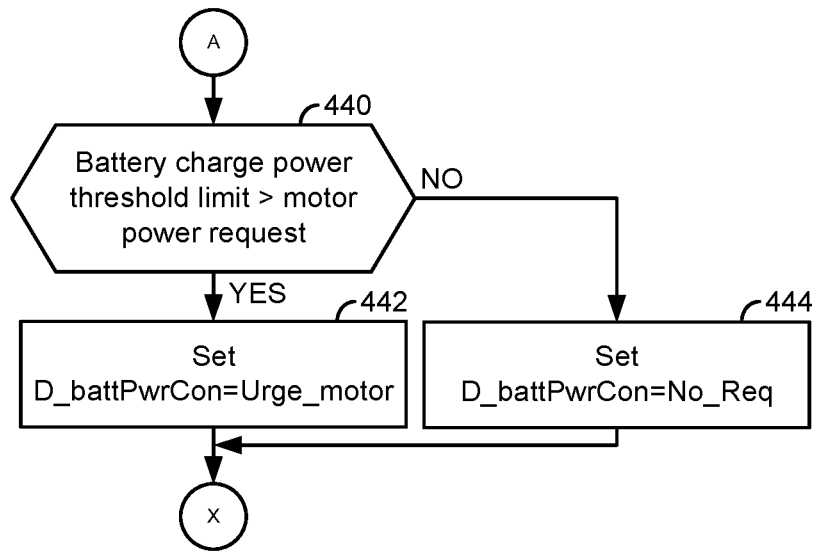
Figure 5:
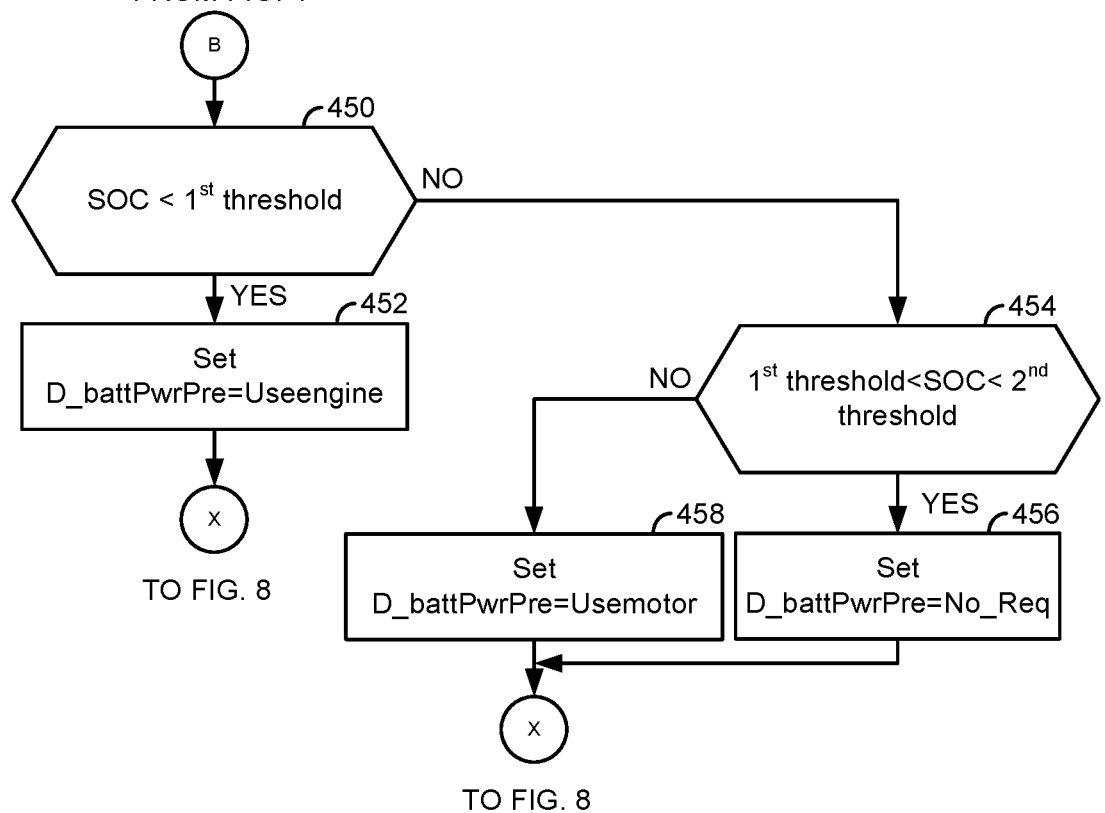
Figure 6:
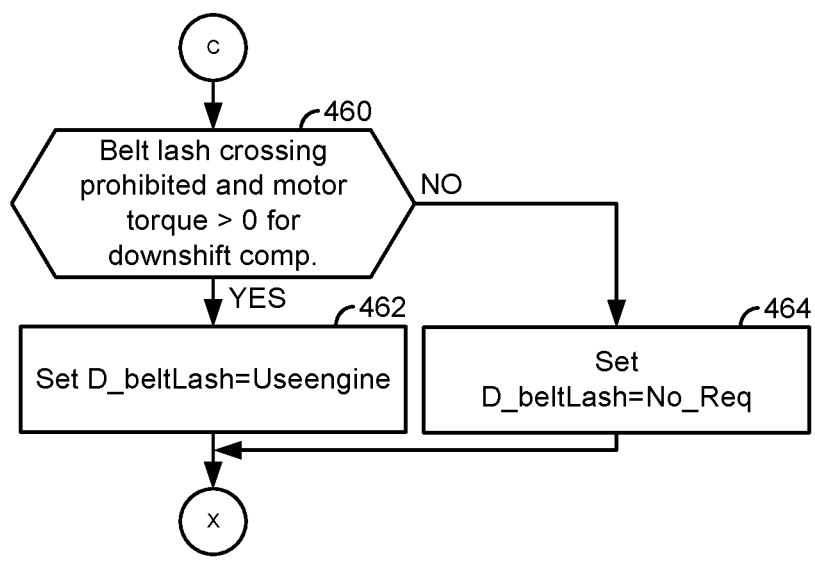
Figure 6:
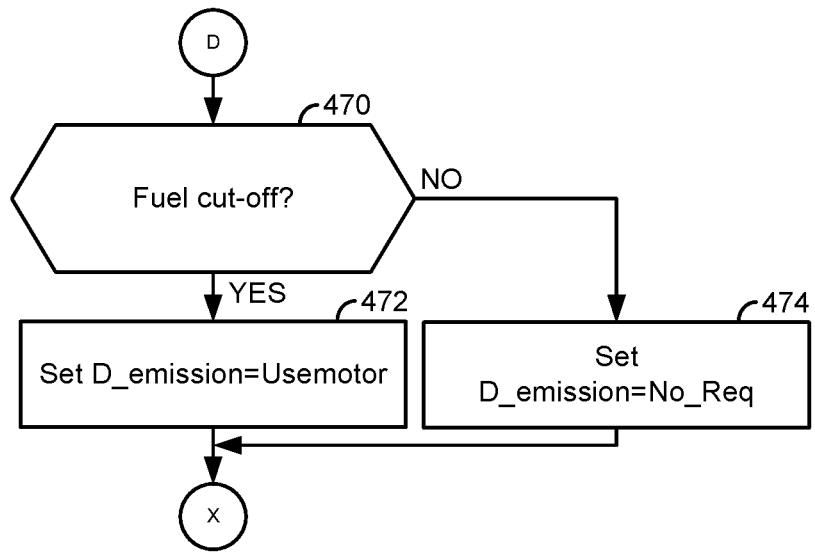
Figure 7:
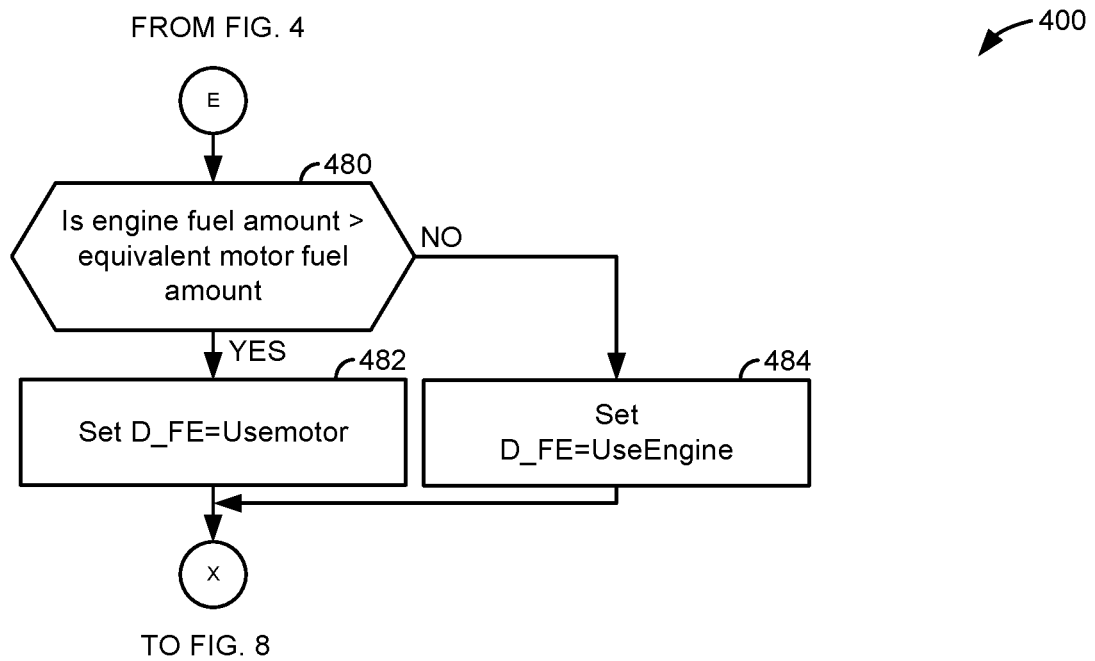
Figure 8:
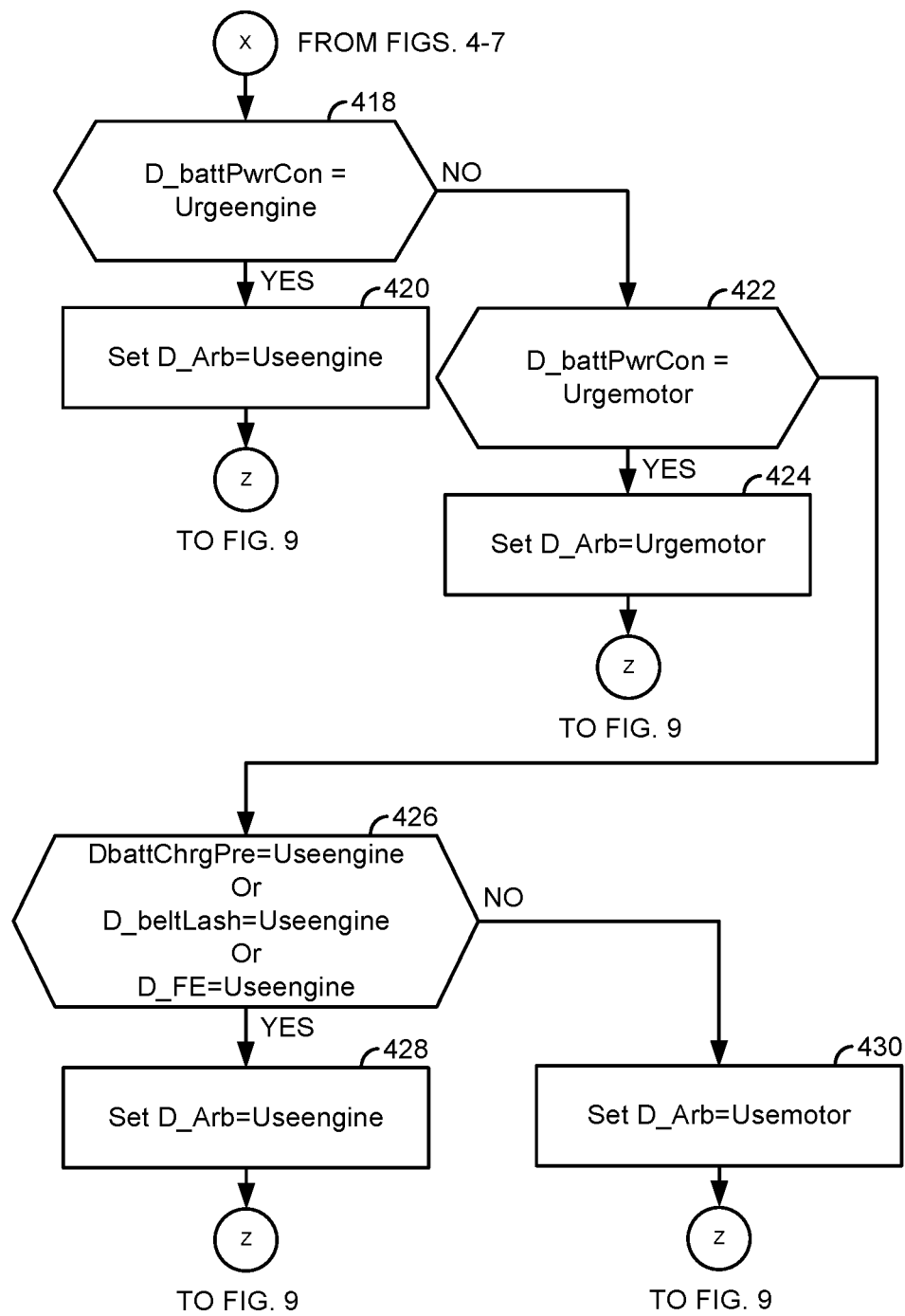
Figure 9:
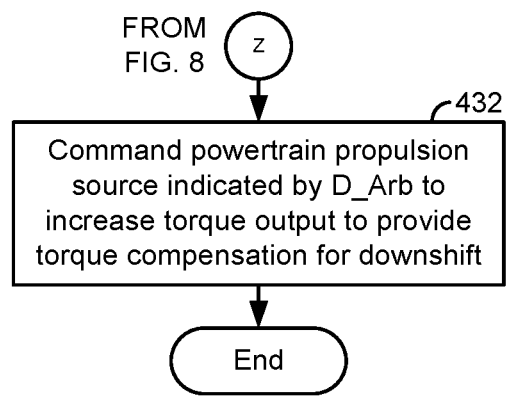

Referring now to FIG. 4, a method for operating a hybrid vehicle is shown. At least portions of method 400 may be implemented as executable controller instructions stored in non-transitory memory. Method 400 may operate in cooperation with the system of FIGS. 1 and 2. Additionally, portions of method 400 may be actions taken via a controller in the physical world to transform an operating state of an actuator or device.

At 402, method 400 determines vehicle operating conditions. Vehicle operating conditions may be determined or estimated via the various sensors described herein. Vehicle operating conditions may include, but are not limited to vehicle speed, engine speed, catalyst temperature, driver demand torque, accelerator pedal position, engine temperature, and ambient temperature and pressure. Method 400 proceeds to 404.

At 404, method 400 judges if a transmission gear downshift has been requested. The transmission gear downshift may be requested via a shift schedule that requests a transmission gear to be activated based on vehicle speed and driver demand torque. In one example, method 400 may judge that a downshift is requested as the vehicle speed decreases. If method 400 judges that a transmission gear downshift is requested, the answer is yes and method 400 proceeds to 408. Otherwise, the answer is no and method 400 proceeds to 406.

At 406, method 400 commands the powertrain propulsion sources (e.g., the electric machine (e.g., ISG) and engine) according to driver demand torque and battery or electric energy storage device state of charge. For example, the engine and the ISG may be commanded to generate a wheel torque that is based on the driver demand torque and vehicle speed. Method 400 proceeds to exit.

At 408, method 400 judges if torque modulation to compensate for a gear shift is requested. Method 400 may judge that torque modulation compensation for a gear shift is requested if speed of the vehicle is being reduced and a downshift is requested (e.g., a request to shift from a higher gear ($5^{th}$ gear) to a lower gear ($4^{th}$ gear)). The torque modulation compensation may be requested to smooth (e.g., reduce torque disturbances in the driveline) the downshift. If method 400 judges that torque modulation to compensate for a gear downshift is requested, the answer is yes and method 400 proceeds to 410. Otherwise, the answer is no and method 400 proceeds to 490. In addition, the engine may enter a fuel cut-off mode where the engine continues to rotate without being fueled so as to conserve fuel and reduce engine exhaust emissions when the vehicle speed is being reduced. The engine may enter fuel cut-off mode in response to an accelerator pedal being fully released or an accelerator pedal being fully released followed by a brake pedal being applied while the accelerator pedal is fully released.

At 490, method 400 continues to operate the hybrid powertrain or driveline in its present mode that may be based on driver demand torque, vehicle speed, and other vehicle operating conditions. For example, when an accelerator pedal is fully released and vehicle speed is being reduced, the engine may enter a fuel cut-off mode where the engine continues to rotate without being fueled so as to conserve fuel and reduce engine exhaust emissions. Depending on the magnitude of driver demand torque, the electric machine may be activated to deliver additional negative torque for powertrain regenerative braking. The electric machine may be an ISG as shown in FIG. 2. Method 400 proceeds to exit.

At 410, method 400 preliminarily estimates an electric machine torque request and an electric machine power request. The electric machine torque request may be determined via the following equation:

$$T_{elec} = T_{dd} - T_{eng}$$

where $T_{elec}$ is the requested electric machine torque, $T_{dd}$ is the driver demand, and where $T_{eng}$ is engine torque. The driver demand torque may be determined via accelerator pedal position, vehicle speed, brake pedal position, and regenerative braking capability. During transmission downshift, the driver demand torque may be overridden by a torque up modulation request from the transmission controller. As previously mentioned, the engine may enter a fuel cut-off mode where the engine continues to rotate and is not fueled when the accelerator pedal is fully released and the brake pedal is applied. The engine torque may be an engine friction torque, which may be a function of engine speed, when the engine is in the fuel cut-off mode. Thus, the electric machine torque may be determined from the driver demand torque and the engine friction torque. The requested electric machine power is determined via the following equation:

$$P_{elec} = T_{elec} \cdot N_{elec}$$

where $P_{elec}$ is the requested electric machine power, $T_{elec}$ is the requested electric machine torque, and $N_{elec}$ is the present electric machine speed.

If $T_{dd} < T_{eng}$, then the electric machine torque may be negative, but the electric machine torque may be less negative as compared to if modulation torque is not requested. The traction battery may be charged during such conditions. If $T_{dd} >= T_{eng}$, then the electric machine torque is zero or positive. ISG belt lash may occur when the ISG torque changes from negative (e.g., absorbing driveline torque) to positive (e.g., supplying torque to the driveline). Method 400 proceeds to 412, 440, 450, 460, 470, and 480.

At 412, method 400 judges if a battery or electric energy storage device discharge power threshold limit is less than the electric machine power request $P_{elec}$. This condition is evaluated when the electric machine is motoring and it requests discharge power from the battery, it assumes discharge power and the electric energy storage device discharge power threshold limit have positive signs (e.g., +10 kilo-Watts). The battery or electric energy storage device discharge power threshold limit may be a function of battery state of charge, battery temperature, and other battery operating conditions. The battery discharge power threshold limit may be a maximum or not to be exceeded battery discharge power limit. For example, if the battery discharge power threshold limit is 10 kilo-Watts, then the battery may not be discharged with a power of higher than 10 kilo-Watts. If method 400 judges that the battery discharge power threshold limit is less than the electric machine power request $P_{elec}$, then the answer is yes and method 400 proceeds to 414. Otherwise, the answer is no and method 400 proceeds to 416.

At 414, method 400 sets a variable D_battPwrCon equal to Urge_engine, where Urge_engine is a variable that represents a high priority level request for the engine to provide the transmission gear shifting modulation torque (e.g., a torque increase out of the engine during the transmission downshift to smooth the transmission downshift). D_battPwrCon is a variable that represents battery or electric energy storage device power capability constraint priority during the transmission downshift. Thus, priority is assigned to the engine so that the engine may provide the modulation torque during the transmission gear shift when the battery or electric energy storage discharge power threshold limit is less than the electric machine power request. This priority may reduce the possibility of discharging the battery or electric energy storage device more than may be desired. Method 400 proceeds to 432.

At 416, method 400 sets a variable D_battPwrCon equal to No_Req, where No_Req is a variable that represents that there is to be no torque source priority for generating the modulation torque during the transmission gear shift. In other words, the engine does not have priority over the electric machine, or vice-versa, to generate the gear shifting modulation torque. D_battPwrCon is a variable that represents battery or electric energy storage device power capability constraint priority during the transmission downshift. Thus, no priority is assigned to the engine or the electric machine for providing the modulation torque during the transmission gear shift. Method 400 proceeds to 432.

At 440, method 400 judges if a battery or electric energy storage device charging power threshold limit is greater than the electric machine power request $P_{elec}$. This condition is evaluated when the electric machine is generating and charging the battery, and it assumes that battery charging power and the electric energy storage device charge power threshold limit have negative signs (e.g., −10 kilo-Watts). The battery or electric energy storage device charging power threshold limit may be a function of battery state of charge, battery temperature, and other battery operating conditions. The battery charging power threshold limit may be a maximum or not to be exceeded battery charging power limit. For example, if the battery charging power threshold limit is 10 kilo-Watts, then the battery may not be charged at a power level that is higher than 10 kilo-Watts. If method 400 judges that the battery charge power threshold limit is greater than the electric machine power request $P_{elec}$, then the answer is yes and method 400 proceeds to 442. Otherwise, the answer is no and method 400 proceeds to 444.

At 442, method 400 sets a variable D_battPwrCon equal to Urge_motor, where Urge_motor is a variable that represents a high priority level request for the electric machine to provide the transmission gear shifting modulation torque (e.g., a torque increase out of the engine during the transmission downshift to smooth the transmission downshift). Thus, priority is assigned to the electric machine so that the electric machine may provide the modulation torque during the transmission gear shift when the battery or electric energy storage charging power threshold limit is greater than the electric machine power request. This priority may reduce engine emissions and reduce fuel consumption. Method 400 proceeds to 414.

At 444, method 400 sets a variable D_battPwrCon equal to No_Req, where No_Req is a variable that represents that there is to be no torque source priority for generating the modulation torque during the transmission gear shift. Thus, no priority is assigned to the engine or the electric machine for providing the modulation torque during the transmission gear shift. Method 400 proceeds to 414.

At 450, method 400 judges if the electric energy storage device or battery state of charge (SOC) is less than a first threshold state of charge. If so, the answer is yes and method 400 proceeds to 452. Otherwise, method 400 proceeds to 454.

At 452, method 400 sets a variable D_battPwrPre equal to Useengine, where Useengine is a variable that represents a medium priority level request for the engine to provide the transmission gear shifting modulation torque. The engine may be started and the engine may provide the modulation torque during the transmission gear shift if the priority of D_battPwrPre is higher than the priority of the other torque modulation priority variables mentioned herein. The variable D_battPwrPre represents a battery charging preference. Method 400 proceeds to 418.

At 454, method 400 judges if the electric energy storage device or battery state of charge (SOC) is greater than the first threshold state of charge and less than a second threshold state of charge. If so, the answer is yes and method 400 proceeds to 456. Otherwise, method 400 proceeds to 458.

At 458, method 400 sets a variable D_battPwrPre equal to Usemotor, where Usemotor is a variable that represents a medium priority level request for the motor or electric machine to provide the transmission gear shifting modulation torque. The electric machine torque output may be increased to provide the modulation torque during the transmission gear shift if the priority of D_battPwrPre is higher than the priority of the other torque modulation priority variables mentioned herein. Method 400 proceeds to 418.

At 456, method 400 sets a variable D_battPwrPre equal to No_Req. Thus, no priority is assigned to the engine or the electric machine for providing the modulation torque during the transmission gear shift. Method 400 proceeds to 418.

At 460, method 400 judges if ISG belt lash crossing is prohibited and if electric machine torque to generate the requested modulation torque during gear shifting is greater than zero. The torque response delay (e.g., an amount of time it takes between commanding the ISG and torque being delivered from the ISG to the engine crankshaft or vehicle driveline) may cause shift quality and drivability concerns if the expected torque up (e.g., a modulation torque increase) cannot be provided in a desired amount of time due to the different need and perceivable level of torque up modulation according to the specific gear shift. Depending on the combination of current gear and target gear for the downshift, the transmission's torque ratio, and input speed change may be different, which leads to a different need and perceivable level of torque up modulation. Therefore, the availability of an active tensioner and the combination of transmission's current and target gear may make the vehicle drivability concerns below or above an acceptable level. Method 400 may judge whether or not an activate tensioner is available based on the presence or absence of an active tensioner. If an active torque tensioner is not available, method 400 may judge that ISG belt lash crossing is prohibited. Further, if the ISG does not have sufficient capacity to provide a modulation torque to compensate for a modulation torque increase when a particular gear is engaged, then method 400 may judge that ISG lash crossing may be prohibited. Thus, ISG belt lash crossing may be prohibited due to the different need and perceivable level of torque up modulation per the specific gear shift.

In addition, ISG belt lash crossing may be prohibited if the actual total number of ISG belt lash crossing events is greater than a threshold number. For example, at the time of manufacture, the actual total number of ISG belt lash crossing events is zero. Each time the ISG torque output changes from a positive torque to a negative torque (e.g., a ISG belt lash crossing event), or vice-versa, the actual total number of ISG belt lash crossing events is incremented by a value of one. If the total number of ISG belt lash crossing events exceeds a threshold number, then ISG belt lash crossing events may be prohibited to prolong ISG belt or ISG tensioner life. ISG belt lash crossing events may impart higher levels of stress on the ISG belt and/or ISG tensioner. Therefore, it may be desirable to limit the actual total number of ISG belt lash crossing events. If ISG belt lash crossing is prohibited and if electric machine torque to generate the requested modulation torque for transmission gear shifting is expected to be greater than zero, then the answer is yes and method 400 proceeds to 462. Otherwise, the answer is no and method 400 proceeds to 464.

At 462, method 400 sets a variable D_beltLash equal to Useengine, where Useengine is a variable that represents a medium priority level request for the engine to provide the transmission gear shifting modulation torque. The engine torque output may be increased to provide the modulation torque during the transmission gear shift if the priority of D_beltLash is higher than the priority of the other torque modulation priority variables mentioned herein. Method 400 proceeds to 418.

At 464, method 400 sets a variable D_beltLash equal to No_Req. Thus, no priority is assigned to the engine or the electric machine for providing the modulation torque during the transmission gear shift. Method 400 proceeds to 418.

At 470, method 400 judges if it is desired that the engine stays in fuel cut-off mode. The engine may enter a fuel cut-off mode where the engine continues to rotate without fuel being injected to the engine. By entering fuel cut-off mode, engine emissions and fuel consumption may be reduced during low driver demand conditions (e.g., when the accelerator pedal is fully released). The engine may enter or exit fuel-cut off mode based on the vehicle's geographic location, catalyst state of operation, and other vehicle operating conditions. If method 400 judges that it is preferred for the engine to stay in fuel cut-off mode, the answer is yes and method 400 proceeds to 472. Otherwise, the answer is no and method 400 proceeds to 474.

At 472, method 400 sets a variable D_emission equal to Usemotor, where Usemotor is a variable that represents a medium priority level request for the motor or electric machine to provide the transmission gear shifting modulation torque. The electric machine may provide the modulation torque during the transmission gear shift if the priority of D_emission is higher than the priority of the other torque modulation priority variables mentioned herein. The variable D_emission represents a vehicle emissions preference. Method 400 proceeds to 418.

At 474, method 400 sets a variable D_emission equal to No_Req. Thus, no priority is assigned to the engine or the electric machine for providing the modulation torque during the transmission gear shift. Method 400 proceeds to 418.

At 480, method 400 judges if the energy consumed by fueling the engine to generate the modulation torque is greater than the energy consumed by the electric machine to generate the modulation torque during a transmission gear shift. If the engine is the actuator for the generating the modulation torque increase, engine's total fuel consumption may be estimated as:

$$fuelRate(t) = f(Tq_{eng}, Spd_{eng})$$

$$fuel_{eng} = \int_0^{time\_TqUP} fuelRate(t)$$

where fuelRate is the engine's fuel consumption rate, t is time, f is a function that returns an engine fuel consumption rate, $Tq_{eng}$ is engine torque, and $Spd_{eng}$ is engine speed. Values stored in the function f may be empirically determined via operating the engine on a dynamometer and adjusting engine speed, engine torque, and engine air-fuel ratio.

Alternatively, if the electric machine and battery are used to generate the modulation torque during shifting instead of the engine, total energy consumed from the battery is:

$$Power_{EM}(t) = \Delta Tq_{mtr} * Spd_{mtr} / (eff(mtr) * eff(batt))$$

$$Energy_{EM} = \int_0^{time\_TqUP} Power\_EM(t)$$

where $Power_{EM}(t)$ is the amount of power that is consumed by the electric machine, $\Delta Tq_{mtr}$ is the change in electric machine torque, $Spd_{mtr}$ is electric machine speed, eff(mtr) is the efficiency of the electric machine, eff(batt) is the efficiency of the electric energy storage device, $Energy_{EM}$ is the amount of energy that is consumed via the electric machine, and time_TqUp is an estimate of the duration that the torque modulation is provided. Here $\Delta Tq_{mtr}$ is the electric machine torque difference:

$$\Delta Tq_{mtr} = Tq_{mtrDur} - Tq_{mtrBef}$$

where $Tq_{mtrDur}$ is the electric machine torque while the electric machine is generating the modulation torque and $Tq_{mtrBef}$ is the electric machine torque immediately before the electric machine begins to generate the modulation torque during the transmission gear shift. Because Tq_mtr=Tq_dd−Tq_eng=Tq_dd+abs(Tq_friction) is generically True before and during the torque modulation event during the transmission gear shift, an increase of driver demand torque Td_dd may cause the electric machine to work against engine friction. The variable eff(mtr) may be the average efficiency for electric machine motoring and regenerating, and eff(batt) can be the average round-trip battery efficiency. Using an equivalency factor (S) between electrical energy and fuel energy, which can be derived by optimal control strategy for energy management in real time driving or set as a constant based on historical data, driving conditions and experience. The electric machine fuel consumption equivalency may be represented as:

$$fuel_{EMEqu} = S * Energy_{EM}$$

where $fuel_{EMEqu}$ is the equivalent fuel consumption of the electric machine. If fuelEng>fuelEMEqu, then the answer is yes and method 400 proceeds to 482. Otherwise, the answer is no and method 400 proceeds to 484.

At 482, method 400 sets a variable D_FE equal to Usemotor, where Usemotor is a variable that represents a medium priority level request for the motor or electric machine to provide the transmission gear shifting modulation torque. The electric machine may provide the modulation torque during the transmission gear shift if the priority of D_FE is higher than the priority of the other torque modulation priority variables mentioned herein. The variable D_FE represents a vehicle fuel economy preference. Method 400 proceeds to 418.

At 484, method 400 sets a variable D_FE equal to Useengine, where Useengine is a variable that represents a medium priority level request for the engine to provide the transmission gear shifting modulation torque. The engine may be started and the engine may provide the modulation torque during the transmission gear shift if the priority of D_FE is higher than the priority of the other torque modulation priority variables mentioned herein. Method 400 proceeds to 418.

At 418, method 400 judges if the variable D_battPwrCon is equal to Urgeengine. If so, the answer is yes and method 400 proceeds to 420. Otherwise, method 400 proceeds to 422.

At 420, method 400 sets a variable D_Arb equal to Useengine, where D_Arb is a variable that represents which powertrain torque source is the highest priority torque source for providing the transmission gear shifting modulation torque. Method 400 proceeds to 432.

At 422, method 400 judges if the variable D_battPwrCon is equal to Urgemotor. If so, the answer is yes and method 400 proceeds to 424. Otherwise, method 400 proceeds to 426.

At 424, method 400 sets a variable D_Arb equal to Usemotor, where D_Arb is a variable that represents which powertrain torque source is the highest priority torque source for providing the transmission gear shifting modulation torque. Method 400 proceeds to 432.

At 426, method 400 judges if the variable D_battChrgPre is equal to Useengine, or if the variable D_beltLash is equal to Useengine, or if the variable D_FE is equal to Useengine. If so, the answer is yes and method 400 proceeds to 428. Otherwise, method 400 proceeds to 430.

At 428, method 400 sets the variable D_Arb equal to Useengine. Method 400 proceeds to 432.

At 430, method 400 sets the variable D_Arb equal to Usemotor. Method 400 proceeds to 432.

At 432, method 400 commands the powertrain propulsion sources according to the variable D_Arb to increase torque output during the transmission gear downshift. For example, if D_Arb is equal to Urgeengine, the engine is commanded to provide the requested non-zero modulation torque. Alternatively, if D_Arb is equal to Urgemotor, the motor or electric machine is commanded to provide the requested modulation torque. Similarly, if D_Arb is equal to Useengine, the engine is commanded to provide the requested modulation torque. Further, if D_Arb is equal to Usemotor, the electric machine is commanded to provide the requested modulation torque during the transmission downshift. The engine may be commanded to deliver the modulation torque via supplying fuel to the engine, adjusting spark timing, and adjusting air flow into the engine (e.g., via the throttle). The electric machine may be commanded to deliver the modulation torque via adjusting an amount of electric current that is delivered to the electric machine. Method 400 proceeds to exit.

In this way, powertrain torque sources for generating modulation torque during a transmission gear downshift may be arbitrated and selected. The method may assign a highest level of priority to the variable Urgeengine. The next lower level of priority may be to the variable Urgemotor. The priority of the variable Useengine may be below the priority of Urgmotor and above the priority of Usemotor.

Thus, the method of FIGS. 4-9 provides for a method for operating a vehicle, comprising: arbitrating between increasing torque of the engine or increasing torque of an electric machine via the controller in response to a transmission gear downshift while the engine is in a fuel cut-off mode. The method includes where the arbitration includes prioritizing increasing torque of the engine and increasing torque of the electric machine according to a battery discharging threshold. The method includes where the prioritizing increasing torque of the engine and increasing torque of the electric machine includes prioritizing torque of the engine according to two levels of engine torque generating urgency. The method includes where the two levels of engine torque generating urgency include a higher urgency and a lower urgency. The method includes where the prioritizing increasing torque of the engine and increasing torque of the electric machine includes prioritizing torque of the electric machine according to two levels of electric machine torque generating urgency. The method includes where the two levels of electric machine torque generating urgency include a higher urgency and a lower urgency. The method further comprises increasing torque output of the engine or the electric machine in response to the arbitration.

The method of FIGS. 4-9 also provides for a method for operating a vehicle, comprising: arbitrating between increasing torque of the engine or increasing torque of an electric machine via the controller in response to a transmission gear shift and to one of an actual total number of belt lash crossing events exceeding a threshold, availability of an active torque tensioner, and a torque increase associated with engaging a particular gear of the transmission while the engine is in the fuel cut-off mode. The method includes where the state of the belt is an actual total number of belt lash crossings since a time that a vehicle was manufactured. The method further comprises arbitrating between increasing torque of the engine or increasing torque of an electric machine via the controller in response to expected fuel consumption of the engine to provide torque to compensate for a transmission gear shift. The method further comprises arbitrating between increasing torque of the engine or increasing torque of an electric machine via the controller in response to expected energy consumption of the electric machine to provide torque to compensate for a transmission gear shift. The method further comprises arbitrating between increasing torque of the engine or increasing torque of an electric machine via the controller in response to an operating state of an emissions device while the engine is in the fuel cut-off mode. The method further comprises arbitrating between increasing torque of the engine or increasing torque of an electric machine via the controller in response to battery state of charge while the engine is in the fuel cut-off mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
arbitrating between increasing torque of the engine or increasing torque of an electric machine via the controller in response to a transmission gear downshift while the engine is in a fuel cut-off mode.

2. The method of claim 1, where the arbitration includes prioritizing increasing torque of the engine and increasing torque of the electric machine according to a battery discharging threshold.

3. The method of claim 2, where the prioritizing increasing torque of the engine and increasing torque of the electric machine includes prioritizing torque of the engine according to two levels of engine torque generating urgency.

4. The method of claim 3, where the two levels of engine torque generating urgency include a higher urgency and a lower urgency.

5. The method of claim 2, where the prioritizing increasing torque of the engine and increasing torque of the electric machine includes prioritizing torque of the electric machine according to two levels of electric machine torque generating urgency.

6. The method of claim 5, where the two levels of electric machine torque generating urgency include a higher urgency and a lower urgency.

7. The method of claim 1, further comprising increasing torque output of the engine or the electric machine in response to the arbitration.

8. A vehicle system, comprising:
an internal combustion engine;
a transmission coupled to the engine;
an electric machine coupled to the engine or the transmission; and
a controller including executable instructions stored in non-transitory memory that cause the controller to increase torque output of the internal combustion engine during a first transmission gear shift in response to one of an actual total number of belt lash crossing events exceeding a threshold, torque response delay time, availability of an active torque tensioner, and a torque increase associated with engaging a particular gear of the transmission.

9. The vehicle system of claim 8, further comprising additional instructions to increase torque output of the electric machine during a second transmission gear shift in response to the actual total number of belt lash crossing events being less than the threshold.

10. The vehicle system of claim 8, further comprising additional instructions to assign a higher priority to increasing torque output of the internal combustion engine than a priority assigned to increasing torque output of the electric machine in response to a battery discharging power limit being less than a motor power request, where the battery discharging power limit has a positive sign.

11. The vehicle system of claim 8, further comprising additional instructions to assign a higher priority to increasing torque output of the electric machine than a priority assigned to increasing torque output of the internal combustion engine in response to a battery charging power limit being greater than a motor power request, where the battery charging power limit has a negative sign.

12. The vehicle system of claim 8, further comprising additional instructions to assign a priority to increasing torque output of the internal combustion engine in response to a battery state of charge.

13. The vehicle system of claim 8, further comprising additional instructions to assign a priority to increasing torque output of the electric machine in response to a battery state of charge.

14. The vehicle system of claim 8, further comprising additional instructions to assign a priority to increasing torque output of the internal combustion engine in response to engine emissions.

15. A method for operating a vehicle, comprising:
arbitrating between increasing torque of the engine or increasing torque of an electric machine via the controller in response to a transmission gear shift and to one of an actual total number of belt lash crossing events exceeding a threshold, availability of an active torque tensioner, torque response delay time, and a torque increase associated with engaging a particular gear of the transmission while the engine is in the fuel cut-off mode.

16. The method of claim 15, where the state of the belt is an actual total number of belt lash crossings since a time that a vehicle was manufactured.

17. The method of claim 15, further comprising arbitrating between increasing torque of the engine or increasing torque of an electric machine via the controller in response to expected fuel consumption of the engine to provide torque to compensate for a transmission gear shift.

18. The method of claim 15, further comprising arbitrating between increasing torque of the engine or increasing torque of an electric machine via the controller in response to expected energy consumption of the electric machine to provide torque to compensate for a transmission gear shift.

19. The method of claim 15, further comprising arbitrating between increasing torque of the engine or increasing torque of an electric machine via the controller in response to an operating state of an emissions device while the engine is in the fuel cut-off mode.

20. The method of claim 15, further comprising arbitrating between increasing torque of the engine or increasing torque of an electric machine via the controller in response to battery state of charge while the engine is in the fuel cut-off mode.

* * * * *